June 2, 1936.  H. D. SEEBECK  2,042,808
SAFETY CHAIN
Filed April 22, 1935
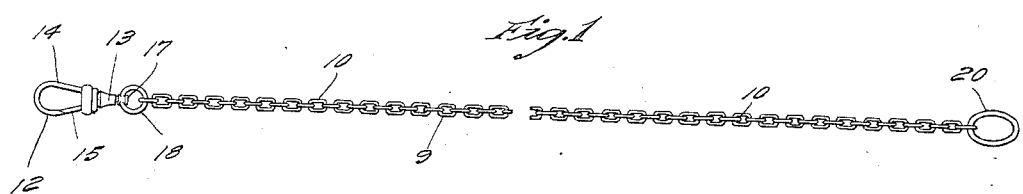
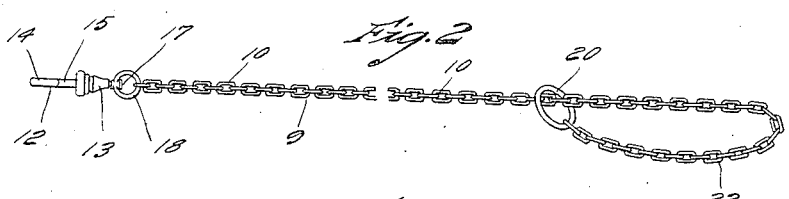
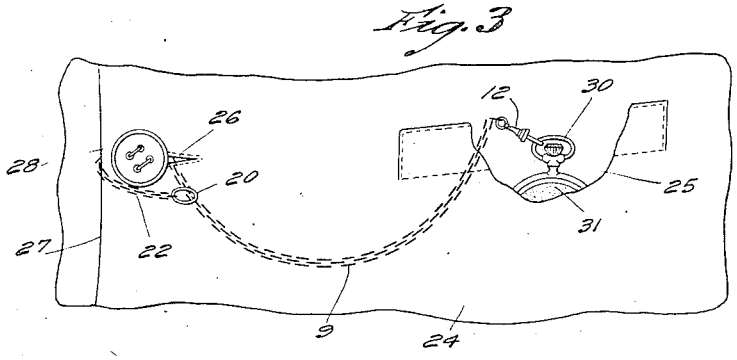
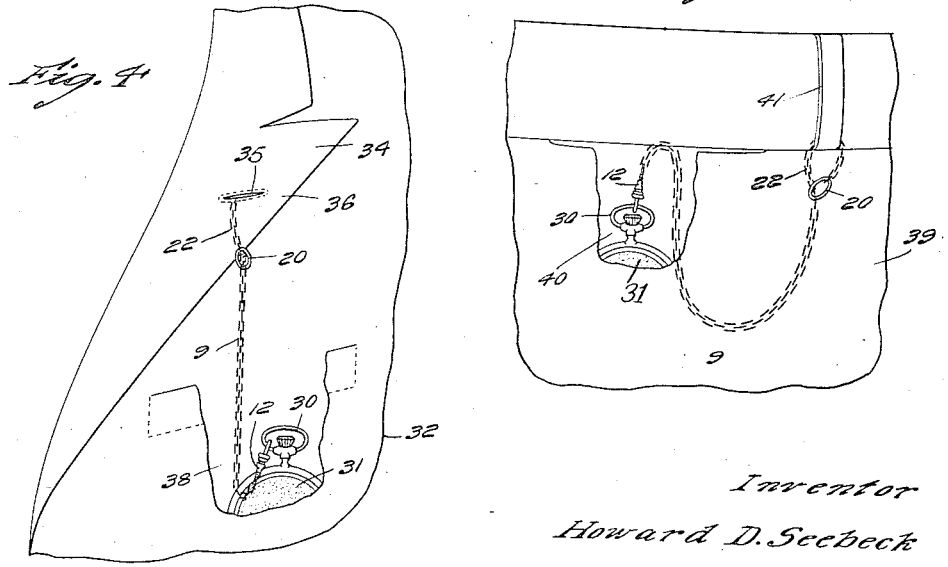
Inventor
Howard D. Seebeck
By Horatio E. Bellows
Attorney Patented June 2, 1936

2,042,808

UNITED STATES PATENT OFFICE 2,042,808

SAFETY CHAIN

Howard D. Seebeck, Chicago, Ill., assignor to Armbrust Chain Company, Providence, R. I., a corporation of Rhode Island Application April 22, 1935, Serial No. 17,687

1 Claim. (Cl. 24—3)

My invention relates to jewelry chains for personal adornment.

An object of my invention is to provide a chain adapted for multiple uses, such as for attachment at one end to a watch bow, pencil ring, knife ring, key ring, or the like, and at its other end for attachment to a vest, coat, belt, loop or other garment or to a convenient portion of a garment. The above list of uses is not exhaustive.

Another object is to enable the engagement of one portion of the chain to the garment so securely that neither the chain nor the article supported by the chain can be accidentally lost nor forcibly detached from the garment.

Further objects of the invention are inexpensiveness of construction and facility of manipulation.

Other and ancillary objects of my invention will hereinafter appear.

To the above recited and indicated ends essentially my invention consists in such parts and in such combinations of parts as fall within the scope of the appended claim.

In the accompanying drawing which forms a part of this specification,

Figure 1 is a front elevation of my chain in detached or unthreaded position,

Figure 2, a similar elevation of my device in engaged or operating position,

Figure 3, a front view of the same employed as a vest chain,

Figure 4, a like view of the same utilized as a coat lapel chain, and

Figure 5, a similar view of the same engaged with a belt loop.

Like characters of reference indicate like parts throughout the views.

In detail my chain comprises a chain length 9 of successively interengaging chain links 10 of any desired or preferred shape or construction.

Attached to one end of the chain length is a safety hook or catch 12 of any usual or preferred construction, and preferably of the swivel type. In this instance the hook comprises the usual hollow conical body 13, beak 14, spring pressed admission lever 15, and swivel stem 17 on which swivels the usual attaching ring 18 engaged with one end link of the chain length.

Passing through the other end link of the chain length is an elongated guide ring 20 whose minimum diameter is slightly greater than the thickness of the safety hook, for the purpose of enabling the hook to be threaded through the ring to form an attaching loop 22, as evident in Figure 2 where the chain is shown in its complete form, with the guide ring 20 slidably engaging an intermediate portion of a chain length. The size of the resultant loop is determined by the extent of movement of the guide ring as a result of applying longitudinal tension to the chain length against the resistance of any article engaged in the loop.

In Figure 3 is shown a fragmentary view of a vest or shirt 24, with a pocket 25 therein, and provided with a button hole 26 adjacent the vertical edge 27 forming the marginal portion 28. The chain length 9 is initially passed through the button hole 26 and the hook end thereof threaded through the ring 20 and drawn up to form the attaching loop 22 embracing the marginal portion 28 of the vest. Next the bow or ring 30 of a watch, knife, pencil or other object 31 is inserted in the hook 12 and placed in the vest pocket 25, where it is secure from accidental or forcible escape from the vest. Any strain upon the chain only forces the loop 22 into still tighter engagement with the vest portion 28 by virtue of the advance of the guide ring.

In Figure 4 is disclosed a fragmentary front view of a coat 32 and lapel 34 having a lapel slit or button hole 35 adjacent the marginal portion 36 of the lapel. In a pocket 38 of the coat is shown the watch 31 to whose ring 30 is attached the hook of my chain. The loop 22 of the latter embraces the marginal portion 36 of the lapel.

In Figure 5 is a fragmentary showing of the trousers 39 and pocket 40 together with a common belt loop 41 embraced by the chain loop 22. The watch or other article 31, attached by its ring 30 to the chain hook, rests in the pocket 40.

It will be observed that in all the illustrated forms of use of my chain there is no possible opportunity of escape of the chain or any article carried thereby from the garment to which the chain is attached.

It is further evident that any excessively strong pull or tension upon the chain length or article carried thereby serves merely to increase the grip of the loop upon the portion of the garment embraced by the latter.

It is also apparent that the endless character of the guard ring and its unbroken surface contour insures unimpeded slidable movement of the ring upon the constituent links of the chain, and cannot abrade the portion of the garment with which it may contact. The elongated form of guard ring presents in sliding less lateral interference with the clothing, and therefore moves more smoothly upon the chain length, than a circular ring.

Without departing from the spirit of my invention other modes of applying the principle thereof may be employed instead of the ones explained, change being made as regards the construction herein disclosed, provided the means stated by the following claim or the equivalent of such stated means be employed.

I claim:—

A jewelry chain comprising a hook member having a swiveled end, a guide ring of approximately elliptical shape having its inside longer diameter only slightly greater than the width of the hook member and having its inside shorter diameter only slightly greater than the thickness of the hook member for passage of the hook member therethrough, and a flexible body having one end attached to the swiveled end and the other end attached to the guide ring.

HOWARD D. SEEBECK.